United States Patent [19]
Lindaberry

[11] 3,765,863
[45] Oct. 16, 1973

[54] CONTROL OF AQUATIC PLANT LIFE
[75] Inventor: Harold L. Lindaberry, Ambler, Pa.
[73] Assignee: Pennwalt Corporation, Philadelphia, Pa.
[22] Filed: Oct. 29, 1970
[21] Appl. No.: 85,223

[52] U.S. Cl. .................................... 71/66, 71/67
[51] Int. Cl. ..................... A01n 9/20, A01n 23/00
[58] Field of Search ................................. 71/66, 67

[56] References Cited
UNITED STATES PATENTS 3,207,593  9/1965  Lindaberry ........................... 71/66
3,512,954  5/1970  Keckemet ............................. 71/66
3,527,593  9/1970  Brian et al. ............................ 71/93

*Primary Examiner*—James O. Thomas, Jr.
*Attorney*—Stanley Litz and Carl A. Hechmer, Jr.

[57] ABSTRACT

Submersed and floating aquatic plant life is controlled by contact with an inhibiting amount of a tertiary amine oxide salt of 3,6-endoxohydro-orthophthalic acid, said amine oxide having the structure $R'\overset{\text{O}}{N}R^2R^3$ where $R'$ is alkyl having 8 to 20 carbon atoms and $R^2$ and $R^3$ are lower alkyl.

10 Claims, No Drawings

CONTROL OF AQUATIC PLANT LIFE

This invention relates to the control of plant life in ponds, lakes, and other bodies of water and deals particularly with the use of certain amine oxide salts for chemical control of aquatic weeds and algae.

Numerous chemical agents are known to inhibit, that is, kill or retard the growth of aquatic plant life, but each agent has disadvantages which limit its usage. For example, there are many potent algaecides which cannot be used because they are extremely toxic to fish at effective concentrations. On the other hand, some agents may effectively control one species of aquatic plant life and be of little or no value with others. Still other agents are known which have limited utility because of their high cost (e.g., silver compounds). Thus, there exists the need for improved means to effectively control the many varieties of undesirable weeds, fungi, and algae existing in ponds, lakes, streams, etc. without harming fish life.

It is known that the disodium salt of endothal (i.e., 3,6-endoxohexahydrophthalic acid) can be used for aquatic weed control. This compound is quite effective and is relatively non-toxic to fish, but it is somewhat slow in its action, and it is, of course, desirable that aquatic herbicides act quickly since fast action also aids to avoid loss by chemical degradation as well as diffusion due to water currents and/or weather conditions. It is also known that tertiary amine salts of endothal can be used for aquatic weed control (H.L. Lindaberry, U.S. Pat. No. 3,207,593), however, even at relatively low concentration, e.g., on the order of about 0.75 to 2 p.p.m., these salts are toxic to fish.

It has now been discovered, in accordance with this invention, that aquatic plant life, submersed and floating, can be effectively controlled without harm to fish life by application, at low to medium concentration, of amine oxide salts (mono-and di) of 3,6-endoxohydro-orthophthalic acid, wherein said amine oxide salt radical is derived from an amine oxide which is a tertiary alkyl amine oxide having the structure $R'\overset{O}{N}R^2R^3$ where $R'$ is alkyl having 8 to 20 carbon atoms and $R^2$ and $R^3$ are lower alkyl radicals which may be the same or different (e.g., methyl, ethyl, propyl, butyl, etc., i.e., having up to six carbon atoms).

The 3,6-endoxohydro-orthophthalic acid salts useful in this invention will have less than three double bonds in the endoxocarboxylic acid ring moiety, but may have all three degrees of ring saturation and thus will include 3,6-endoxodihydroorthophthalic acids,

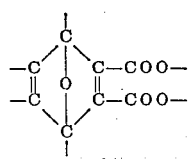

3,6-endoxotetrahydro-orthophthalic acids,

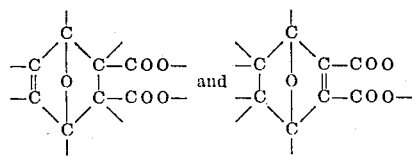

and 3,6-endoxohexahydro-orthophthalic acids (endothal),

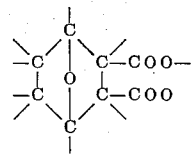

It will be understood that all of the 3,6-endoxohydrophthalic acids and anhydrides may be used to form salts with the tertiary amine oxides defined above to give the compounds useful in this invention. Where anhydrides are used to produce the salts, a mole of water must be added to cause hydrolysis to the dibasic acid. In addition to the unsubstituted acids, monovalent radical substituted derivatives may be used and such substituents will include halogens (e.g., chlorine, bromine, etc.), lower alkyl, lower alkoxy, lower aryl, lower aryloxy, nitro, cyano, haloalkyl (e.g., trifluoromethyl and like groups.) The substituted acids from which the salts useful in this invention are derived and their preparation are described in U.S. Pat. No. 2,576,080.

The preparation of the amine oxide salts of the 3,6-endoxohydrophthalic acids is readily carried out, without need of critical controls, simply by contacting the desired amine oxide with a stoichiometric amount of the desired 3,6-endoxohydrophthalic acid or anhydride. The temperature for the reaction will usually be between about 30° and 90° C. and the process is completed in a short time. As previously stated, both the mono- and di-tertiary amine oxide salts of the acid may be prepared and used in this invention. To prepare the mono-salt the stoichiometric amount of amine oxide used will simply be one-half that required for the dibasic salt.

The tertiary amine oxides used to prepare the acid salts used in this invention are known compounds, the preparation of which are described in the chemical literature. Representative amine oxides embodied by the generic formula $R'\overset{O}{N}R^2R^3$ include N,N-dimethyllaurylamine oxide, N,N-diethylmyristylamine oxide, N,N-di-propylstearylamine oxide, and the like. However, because of availability and cost, mixtures of amine oxides will preferably be used such as the mixtures found in N,N-dimethylcocoamine oxide, N,N-dimethyl soyaamine oxide and the like. Mixtures of the amine oxides may also be used in preparing the active mono or disalts, or two different amine oxides may be used in sequence to make disalts wherein each carboxyl group of the acid molecule is combined with a different amine oxide.

Particularly preferred for use in the method of this invention are the mono and the disalts of the acid wherein the amine oxide is a tertiary amine oxide containing two $C_1$ to $C_3$ alkyl groups, especially methyl groups, and one higher alkyl group such as octyl, lauryl, tridecyl or octadecyl.

Accordingly, the preferred compounds include the mono-and di-(N,N-dimethyl-higher alkylamine oxide salts of endothal and the corresponding mono and di-salts, for example, where the amine oxide is N,N-dimethyl-nonyl amine oxide, N,N-dimethyl-dodecylamine oxide, N,N-dimethyl-tridecylamine oxide, N,N-dimethyl-hexadecylamine oxide, N,N-dimethyl-octadecylamine oxide, N,N -dimethyl-docosylamine oxide or an alkylamine oxide derived from natural products such as N,N-dimethyl-cocoamine oxide, N,N-dimethylsoybean-amine oxide and N,N-dimethyl tallow amine oxide. Other highly effective salts can be derived from N,N-diethyl-higher alkylamine oxides such as N,N-diethyl-lauryl-amine oxide or from N,N-dipropyl-higher alkylamine oxide such as N,N-diisopropyloctadecylamine oxide. Salts obtained by reacting endothal with a mixture of amine oxides, e.g., a disalt obtained by combining one mole of endothal with 1 mole of N,N-dimethyl-cocoamine oxide and 1 mole of tridecylamine oxide are also effective.

The amine oxide salts of endothal described above act as a contact poison and for this reason, aquatic weed control is rapidly achieved simply by treating the area with sufficient material to maintain a given strength of active ingredient in the water surrounding the exposed tissue surface area of the plant, generally from about 0.5 to about 5 parts per million parts of the water. For most applications where an entire area such as a pond or lake is treated, the preferred concentrations of about 1 to 2 p.p.m. of the amine oxide salt will be quite effective as a herbicide with no harm to fish life, although concentrations as high as 10 p.p.m. has generally been observed to be safe to most fish under field conditions. In contrast, the corresponding amine salts of 3,6-endoxohydro-orthophthalic acid are quite toxic to fish in comparison to the amine oxide salts embodied herein, and concentrations of the amine salts greater than 0.75 p.p.m. can be harmful to fish. As mentioned above, concentrations of the amine oxide salts can be as high as 10 p.p.m. without general harm to fish. However, for control of very resistant weeds, where no fish are present, a dosage of up to about 50 p.p.m. may be employed.

The manner in which the water area may be treated will vary with the specific problems encountered. Since the active ingredient (amine oxide salt) is water-soluble, it will diffuse out from the area treated. In treating small areas where the weed problem is usually critical around the edge of the pond, it is more practical to treat the marginal area from the bank than to treat from the center. Furthermore, because of the diffusion of the agents toward the center in static water, control will be obtained there also. Although aqueous solutions are usually preferred for economic reasons, solutions of the amine oxide salts in other solvents may be used for the water treatment. The amine oxide salts are readily soluble in water, ethanol, isopropanol and other alcohols, benzene, toluene, xylene and other aromatic hydrocarbons, diethyl ether and diacetone alcohol.

Treatment is desirably accomplished by spraying on the water or by injection just below the water surface with distribution as evenly as possible in the area to be treated. Spraying equipment is preferably used with solutions of the amine oxide salt. In general, the dilute treating solution will contain about 10 percent to about 25 percent by weight of active ingredient. It may frequently be desirable to incorporate a small amount of a dispersant as a mixing aid in the initial concentrate used to prepare diluted treating solutions. For this purpose isopropyl alcohol, diacetone alcohol or other water soluble alcohols or ketones may be used. Where a dispersant is used, the formulated concentrate will usually contain from about 15 percent to 30 percent of the dispersing agent.

In addition to treating the area with a solution by a spraying technique, the treating agents may also be formulated in a granular form and applied by any of the variety of manual, electrical and gas-powered whirling spreaders on the market and which can be adapted for use on boats. This granular formulation consists of an approximately 1 to 10 percent (preferably about 5 percent) concentration of active agent deposited on an inert material such as Attapulgite, Bentonite and other inert adsorbent granulated clays having a size range of about 8 to 30 mesh (U.S. sieve size).

The granular formulations can be simply prepared by spraying the liquid active ingredient or concentrates thereof into the granular inert carrier in a rotating or other suitable blender common to the trade for preparation of pesticide formulations. Although the granulated formulations can be prepared containing from 1 to 25 percent of active ingredient, it has been found that 5 percent of the active ingredient is generally the best concentration to use for obtaining good distribution when the formulation is applied. Use of a granular formulation is advantageous for control of submerged algae since the granular agent sinks to the bottom of the pond.

The amine oxide salts embodied herein have broad spectrum activity and the invention is effective against practically all aquatic plants and growth which cause problems in lakes, ponds, rivers, streams, etc. Thus the invention is useful in controlling pondweeds (Potamogeton spp), including bassweed, curly leak pondweed, floating-leaf pondweed, sago pondweed, flat-stem pondweed, bushy pondweed (Naias spp), horned pondweed (Zannichellia sp.), coontail (Ceratophyllum sp), water milfoil (Myriophyllum spp), mud plantain and water stargrass (Heteranthera spp), bladderwort (Utricularia spp.), burr weed (Sparganium spp), tapegrass, wild celery, eelgrass (Vallisneria sp.), waterweed (Elodea spp.), members of the duckweed family, such as big duckweed (Spirodella sp), duckweed (Lemna spp.), watermeal (Wolffia spp., Wolffiella sp.)stonewort, muskgrass (Chara spp.) and the filmentous green algae known as pond scum (Cladophora, Spirogyra, Pithophora Rhizochlonium, Ulothrix), and the sub-tropical marine algae Gymnodinium brevis which causes the red tide disease in fish. In addition, the invention is useful for the control of slime causing bacteria, such as Aerobacter aerogenes, Bacillus mycoides, Pseidomomonas originosa. In addition to protecting ponds and lakes, the invention is applicable to the control of algae and slime forming bacteria in cooling towers and other water recirculating systems as used in paper manufacturing processes for example, in drainage ditches and other water flowing sites.

In the following representative examples presented as illustrative of the invention, amounts and proportions of ingredients are given in weight percent and in parts by weight.

EXAMPLE I

The herbicidal efficacy of amine oxide salts of endothal (3,6-endoxohexahydro-orthophthalic acid) in controlling aquatic weeds is observed by a standard method in a series of tests wherein measured amounts of weed control agent are charged to gallon jars of dechlorinated tap water containing various species of representative aquatic weeds. The samples are maintained at room temperature for measured periods of time, and at stated intervals the control of the weeds is reported as the percent of weeds killed relative to a check sample to which no herbicide is added. The results are tabulated in the following tables:

Test No. 1

Weed Control Agent: Di(N,N-dimethyltridecylamine oxide) salt of endothal

| Aquatic Weed | Control of Weed at Concentration of Agent of: | | | |
|---|---|---|---|---|
| | 3 p.p.m. | | 4 p.p.m. after: | |
| | 4 weeks | 6 weeks | 4 weeks | 6 weeks |
| Elodea | 80% | 100% | 90% | 100% |
| Cabomba | 60% | 100% | 80% | 100% |
| Duckweed | 90% | 100% | 85% | 100% |
| Sago Pondweed | 100% | 100% | 87% | 100% |

Test No. 2

Weed control agent: Di(N,N-dimethyltridecylamine oxide) salt of endothal

| Aquatic Weed | Control of Weed at Concentration of Agent of: | | | |
|---|---|---|---|---|
| | 1 p.p.m. | | 2 p.p.m., after | |
| | 4 weeks | 6 weeks | 4 weeks | 6 weeks |
| Elodea | | | 100% | 100% |
| Cabomba | 95% | 100% | 100% | 100% |
| Duckweed | | | 100% | 100% |
| Coontail | 100% | 100% | 100% | 100% |
| Sago Pondweed | 67% | 50% | 97% | 100% |

Test No. 3

Weed control agent: Mono(N,N-dimethyltridecylamine oxide) salt of endothal

| Aquatic Weed | Control of Weed at Concentration of Agent of: | | | |
|---|---|---|---|---|
| | 2.5 p.p.m. | | 5 p.p.m. | |
| | 4 weeks | 6 weeks | 4 weeks | 6 weeks |
| Elodea | 50% | 82% | 67% | 95% |
| Cabomba | 94% | 100% | 94% | 100% |
| Duckweed | 60% | 90% | 90% | 100% |
| Sago Pondweed | 65% | 95% | 30% | 62% |

EXAMPLE II

The foregoing results were confirmed in field tests involving the treatment of naturally aquatic weeds in a pond located in Naperville, Illinois, under summer and fall weather conditions. The representative aquatic herbicide employed was the di(N,N-dimethyltridecylamine oxide) salt of endothal at a concentration of 2 p.p.m. The tests were made in 2-foot diameter, 2 foot deep, plastic enclosures set in the pond, with the following results.

| Aquatic weed | % kill after 14 days |
|---|---|
| Duckweed | 95 |
| Chara | 100 |
| Elodea | 100 |
| Pondweed (Potamogeton pusillus) | 100 |

In the "control" enclosure to which no herbicidal agent was added, the weeds continued to thrive.

EXAMPLE III

Tests were carried out as described in Example I using other representative amine oxide salts embodied in this invention.

Test No. 1

Weed control agent: Mono(N,N-bis(2-hydroxyethyl) cocoamine oxide) salt of endothal.

| Aquatic weed | Control of weed at Concentration of Agent of | |
|---|---|---|
| | 2 p.p.m. 4 weeks | 6 weeks |
| Coontail | 100% | 100% |
| Sago Pondweed | 25% | 50% |
| Elodea | 5% | 25% |

Test No. 2

Weed control agent: Mono(N,N-dimethylcocoamine oxide) salt of endothal

| Aquatic weed | Control of weed at Concentration of Agent of | |
|---|---|---|
| | 1.5 p.p.m. 4 weeks | 6 weeks |
| Coontail | 100% | 100% |
| Sago Pondweed | 77% | 100% |
| Elodea | 35% | 45% |

Example IV

Conventional fish toxicity tests were conducted to demonstrate the tolerance of fish to the amine oxide salts embodied in the present invention, and the relatively high fish toxicity of representative analogous amine salts. In the tests, three goldfish are placed in each of a series of gallon jars containing dechlorinated water. 24 hours later a measured amount of the aquatic herbicide is added and after 72 hours has passed, the effect on the fish is recorded. The results are reported in the following table.

| Aquatic Weed Control Agent | Concentration in Water | % of Fish Killed |
|---|---|---|
| D(N,N-dimethyltridecylamine oxide) salt of endothal | 2 p.p.m. | 0 |
| | 3 p.p.m. | 0 |
| | 5 p.p.m. | 0 |
| | 10 p.p.m. | 33 |
| Mono(N,N-dimethyltridecylamine oxide) salt of endothal | 2.5 p.p.m. | 0 |
| | 5 p.p.m. | 0 |
| | 10 p.p.m. | 0 |
| | 25 p.p.m. | 0 |
| | 50 p.p.m. | 100 |
| Mono(N,N-bis(2-hydroxyethyl)cocoamine oxide) salt of endothal | 2 p.p.m. | 0 |
| Mono(N,N-dimethylcocoamine oxide) salt of endothal | 5 p.p.m. | 0 |
| Di(N,N-dimethyltridecylamine) salt of endothal | 2 p.p.m. | 100 |
| Di(N,N-dimethyl(hydrogenated)tallow amine) salt of endothal | 2 p.p.m. | 100 |
| Di(N,N-dimethylhexadecylamine) salt of endothal | 2 p.p.m. | 100 |

The foregoing results illustrate that the amine oxide salts are surprisingly relatively harmless to fish compared to amine salts, a significant advantage for the present invention.

EXAMPLE V

The dimethylcocoamine oxide salt of endothal is applied at a concentration of 4 ppm to aquaria containing the aquatic weeds Nitella and potamogeton crispus. One week after treatment, the weeds slumped to the bottom and started to decompose. After three more weeks had passed, it was observed that the weeds in the treated aquaria had completely decomposed, whereas weeds in untreated "control" aquaria remained in a healthy growing condition.

EXAMPLE VI

A small fish pond in Ambler, Pennsylvania containing large quantities of filamentous green algae, was treated in early autumn with 3 ppm. of the dimethylcocoamine oxide salt of endothal. Within 10 days the green algae had disappeared from the pond and none was seen to return when observed four weeks from the date of application of the herbicide. None of the abundant fish life in the pond was killed nor appeared to be harmed in any way by the algaecide treatment.

I claim:

1. A process to inhibit aquatic plant life which comprises contacting said plant life with an inhibiting amount of a tertiary amine oxide salt of 3,6-endoxohydroorthophthalic acid, said tertiary amine oxide having the structure $$R' NR^2R^3$$

where $R'$ is alkyl having 8 to 20 carbon atoms and $R^2$ and $R^3$ are lower alkyl.

2. A process in accordance with claim 1 wherein the salt is the di-dimethyltridecylamine oxide salt of the acid.

3. A process in accordance with claim 1 wherein the salt is the mono-dimethyltridecylamine oxide salt of the acid.

4. A process according to claim 1 wherein the salt is the monodimethylcocoamine oxide salt of the acid.

5. A process according to claim 1 wherein the salt is the didimethylcocoamine oxide salt of the acid.

6. A process according to claim 1 wherein the salt is the didimethyl-(hydrogenated)tallowamine oxide salt of the acid.

7. A process according to claim 1 wherein the salt is the di-dimethylhexadecylamine oxide salt of the acid.

8. A process according to claim 1 wherein the salt is the mono-dimethylhexadecylamine oxide salt of the acid.

9. A process according to claim 1 wherein the concentration of the amine oxide salt is within the range of about 0.5 part to 10 parts per million parts of water surrounding the plant life.

10. A process according to claim 1 wherein the concentration of the amine oxide salt is from about 1 to about 2 parts per million parts of water surrounding the plant life.

* * * * *

UNITED STATES PATENT OFFICE
CERTIFICATE OF CORRECTION

Patent No. 3,765,863                    Dated October 16, 1973

Inventor(s)   Harold L. Lindaberry

It is certified that error appears in the above-identified patent and that said Letters Patent are hereby corrected as shown below:

Line 4 of the abstract, "$R'\overset{o}{N}R^2R^3$" should read -- $R'\overset{O}{N}R^2R^3$ --

Column 2, line 38, formula "$R'\overset{o}{N}R^2R^3$" should read -- $R'\overset{O}{N}R^2R^3$ --

Column 5, line 38 insert "occurring" after naturally and before aquatic

Column 6, Example IV, line 27 "D(N,N-dimethyltridecyalmine oxide) should read --Di(N,N-dimethyltridecyalmine oxide)--

Column 6, line 29, "3 p.p.m." should appear under the heading "Concentration"

Column 7, Claim 1, Line 9, correct the chemical formula to read -- $R'\overset{O}{N}R^2R^3$ --

Signed and sealed this 19th day of February 1974.

(SEAL)
Attest:

EDWARD M. FLETCHER, JR.
Attesting Officer

C. MARSHALL DANN
Commissioner of Patents